(12) United States Patent
Oriet et al.

(10) Patent No.: US 7,980,350 B2
(45) Date of Patent: Jul. 19, 2011

(54) CHASSIS MOUNTED ELECTRIC, INDEPENDENT, STEERING AXLE OF A VEHICLE

(75) Inventors: Leo P. Oriet, Rochester Hills, MI (US); Andre Bocancea, Windsor, CA (US)

(73) Assignee: Navistar Canada, Inc. (CA)

( * ) Notice: Subject to any disclaimer, the term of this patent is extended or adjusted under 35 U.S.C. 154(b) by 234 days.

(21) Appl. No.: 12/480,923

(22) Filed: Jun. 9, 2009

(65) Prior Publication Data

US 2010/0307842 A1 Dec. 9, 2010

(51) Int. Cl.
*B60K 17/00* (2006.01)
*B62D 21/00* (2006.01)

(52) U.S. Cl. ........ 180/252; 180/312; 180/359; 180/360; 180/370; 180/374; 180/377

(58) Field of Classification Search .................. 180/65.1, 180/252, 253, 291, 292, 312, 348, 353, 354, 180/359, 360, 370, 372, 374, 375, 377, 378; 280/93.514

See application file for complete search history.

(56) References Cited

U.S. PATENT DOCUMENTS

| | | | | |
|---|---|---|---|---|
| 1,597,366 | A | * | 8/1926 | Lundelius ................... 180/360 |
| 3,439,767 | A | * | 4/1969 | Lynes et al. .................... 180/60 |
| 4,437,530 | A | | 3/1984 | De Young et al. |
| 4,657,102 | A | * | 4/1987 | Kanazawa et al. ........... 180/415 |
| 5,924,504 | A | | 7/1999 | Ruppert, Jr. et al. |
| 6,328,123 | B1 | | 12/2001 | Niemann et al. |
| 6,516,914 | B1 | * | 2/2003 | Andersen et al. ............ 180/360 |
| 6,537,167 | B1 | | 3/2003 | Gazyakan et al. |
| 6,727,620 | B2 | | 4/2004 | White et al. |
| 7,147,073 | B2 | | 12/2006 | Mollhagen |
| 2006/0054368 | A1 | | 3/2006 | Varela |
| 2006/0225930 | A1 | | 10/2006 | Schulte |
| 2007/0051549 | A1 | * | 3/2007 | Fukuda ......................... 180/232 |
| 2007/0158119 | A1 | | 7/2007 | Pascoe |
| 2008/0078603 | A1 | * | 4/2008 | Taji et al. ...................... 180/312 |

* cited by examiner

*Primary Examiner* — Paul N Dickson
*Assistant Examiner* — Marc A Scharich
(74) *Attorney, Agent, or Firm* — Jeffrey P. Calfa; Mark C. Bach

(57) ABSTRACT

A chassis frame (10) has a cross member (22) that bridges right and left side rails (18, 20). Right and left wheel units (14, 16) comprising respective right and left steered road wheels (24, 26) are suspended from the frame by respective multi-link suspensions (33). A steering system (28) steers the wheels. An electric motor (34) and gear box (36) mounted on the cross member is coupled to the right and left wheels by respective drive shafts (38, 40). The weight of a brake system (42, 44) for the wheels is supported by the frame.

8 Claims, 1 Drawing Sheet

CHASSIS MOUNTED ELECTRIC, INDEPENDENT, STEERING AXLE OF A VEHICLE

FIELD OF THE INVENTION

This invention relates to wheeled vehicles, especially large trucks and busses.

BACKGROUND OF THE INVENTION

Dependent steering axle suspensions have been consistently used in virtually all commercial trucks and buses. Dependent steering axle suspensions physically link right and left steered wheels by a solid cast iron bar (axle) under the front of the vehicle. The bar is suspended from the chassis by heavy leaf springs and shock absorbers.

Such a design is inherently subject to conditions that include but are not necessarily limited to: axle oscillation when one front wheel hits a bump; gyroscopic torque about the steering axis that tends to turn the axle from left to right when the vehicle is being forwardly propelled; axle inertia amplification of original motion from a road bump; substantial unsprung weight due to a heavy bar that requires heavy linkages and leaf springs (i.e., unsprung weight) for its suspension; wheel misalignment if the axle becomes bent; and poor, or non-existent, lateral control of axle bar location, a significant performance issue.

The internal combustion engine, typically a diesel engine, has consistently been the powerplant of large commercial vehicles. However, alternate types of powerplants are gaining more widespread usage in the broader automotive industry for various reasons, primarily emission- and fuel-related.

One type of alternate-powered vehicle has electric drive motors mounted directly into the wheels. Such a propulsion system however significantly increases the ratio of unsprung to sprung weight of the vehicle. Sprung weight comprises the weight of that portion of a vehicle supported by the springs, and unsprung weight comprises the weight of the springs and that of the remainder of the vehicle. Wheel mounted motors are also subject to severe impacts from road bumps during service, and such impacts can significantly shorten the life of these electric drive units.

In one hybrid commercial vehicle, an example of which is the Orion VII Hybrid Transit Bus, an electric motor is coupled to the output of a diesel engine and is mechanically coupled to a heavy, rigid, conventional commercial truck rear axle. The weights of both the electric motor and the diesel engine are sprung because they are chassis-mounted. However, the rear suspension in this vehicle is a heavy, dependent (i.e., non-independent) system, and the axle is a non-steering axle.

In a de Dion tube suspension, the differential and the disk brakes are removed from the unsprung weight by hanging them to the chassis. Such a design is sometimes called chassis-mounted differential and brakes.

SUMMARY OF THE INVENTION

The present invention is a result of the inventors' recognition of a number of factors relevant to commercial vehicle design, including the ones mentioned above.

Reducing the ratio of unsprung to sprung weight is vital for increasing truck and bus drivability and handling performance because the greater the ratio, the greater the inertia of the suspension, making it unable to respond as quickly to rapid changes in a road surface.

A vehicle that uses only battery-powered electric propulsion removes an internal combustion engine from a vehicle's powerplant, making compliance with tailpipe emission and fuel economy requirements non-issues because the vehicle is a no emissions (NE) vehicle.

The inventive chassis-mounted electric, independent, steering—truck axle to be described here provides a significant reduction in the ratio of unsprung to sprung weight in conjunction with independent steering, resulting in improved vehicle handling and performance, an improvement that would be quite beneficial to owners/operators of large commercial vehicles.

The inventive chassis-mounted electric, independent, steering—truck axle accomplishes these improvements through a combination of independent features that include: mounting the electric motor between the chassis frame rails to remove the contribution of the electric motor from the unsprung weight and removing the wheel brakes from the unsprung weight.

The inventive chassis-mounted electric, independent, steering—truck axle has a five through eight-link (multi-link) suspension with combinations of coil springs in independent suspension systems for each wheel. Each link performs a specific truck wheel-locating task to ensure constant steering stability and superior handling amid changing road and load conditions while the wheels can move independently of one another. This reduces truck and bus chassis movement on rough surfaces in comparison to walking beam articulations where as much as about eighteen inches is required in known designs while maintaining optimal wheel control at all times.

The main mechanism, components, and features include: Chassis Mounted Electric Motor; Chassis Mounted Electric Brakes; Chassis Mounted Rack-in-Pinion; Electric Steering Rack-in-Pinion; Independent Suspension; Common Axle Architecture for front and rear application; All Wheel Steer (AWS)—electronic all-wheel steering.

Using the inventive chassis-mounted electric, independent, steering—truck axle in both front and rear of a vehicle gives the vehicle all wheel steering (AWS), and hence a reduced turning radius (about 30%) for buses with two steering axles.

One general aspect of the invention relates to a vehicle chassis comprising: a chassis frame having a cross member that bridges right and left side rails; right and left wheel units respectively comprising right and left steered road wheels suspended from the frame by respective multi-link suspensions; a steering system for steering the steered wheels; an electric motor and gear box mounted on the cross member and coupled to the right and left road wheels by respective drive shafts; and a brake system for the road wheels whose weight is supported by the frame.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
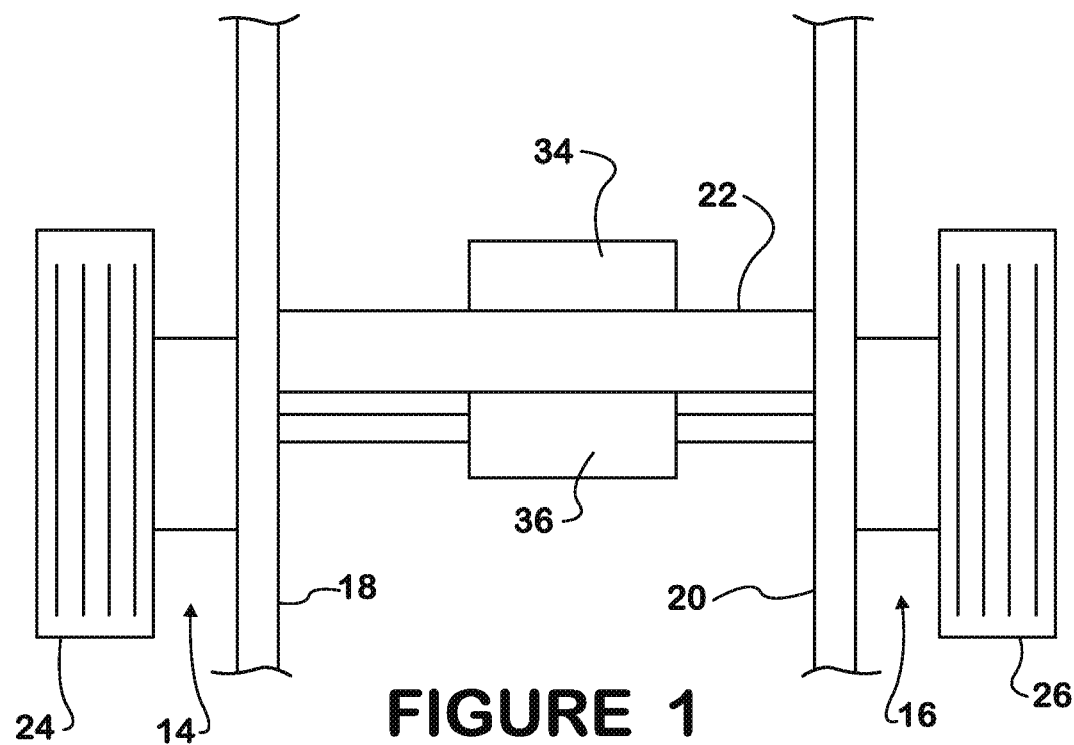
FIG. 1 is a top plan diagrammatic view of a vehicle chassis frame having an electric, independent, steering axle according to the present invention.
Figure 2:
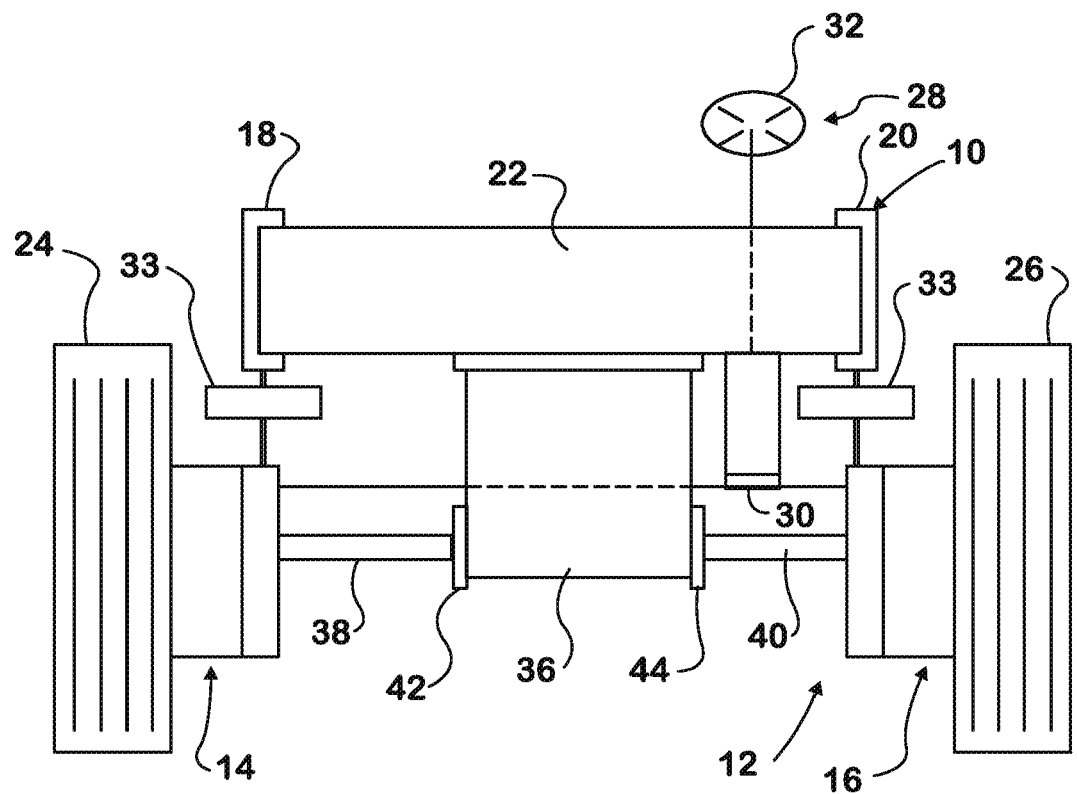
FIG. 2 is front view of FIG. 1.

FIGS. 1 and 2 show a truck chassis frame 10 having an electric, independent, steering axle 12 that comprises right and left wheel units 14, 16 each independently suspended from frame 10. The truck cab that mounts on the chassis frame is not specifically shown.

Frame 10 comprises right and left side rails 18, 20 running lengthwise of the frame and comprising respective steel channels. Frame 10 comprises one or more cross members at locations along the frame length, such as the one marked 22.

Right wheel unit 14 comprises a spindle-mounted right wheel 24, and left wheel unit 16, a spindle-mounted left wheel 26. The spindles have journaled mountings in each wheel unit that enable the wheels to turn about respective generally vertical axes as they are being steered by a steering system 28.

Steering system 28 preferably comprises an electrically assisted rack-in-pinion steering mechanism 30 that is operated by the usual steering wheel 32 within the interior of the vehicle and that is coupled with the respective wheel units to turn wheels 24, 26 in unison to provide symmetric steering for the vehicle. The rack-in-pinion steering unit can be speed-sensitive, reducing steering effort at lower speeds while increasing it at higher speeds to reduce the risk of undesired incidents caused by inadvertent steering wheel turning at high speeds. While a unit that provides symmetric steering is preferred, a conventional power steering gear is contemplated as an alternative.

Each wheel unit is suspended from frame 10 by a multi-link suspension 33 that also includes elements providing damped elasticity.

For delivering torque to each wheel, an electric motor 34 is mounted on cross member 22 and coupled to the wheels by a mechanism that includes a gear box 36 on motor 34 and drive shafts 38, 40 having universal joints coupling the gear box with each wheel.

Wheel brakes 42, 44 are integrated with gear box 36 at the gear box output to each driveshaft.

With the construction that has been described, the weight of motor 34, gear box 36, and wheel brakes 42, 44 becomes sprung weight. The only unsprung weight is that of the independently suspended wheel units and wheels.

The construction that has been described can be considered as a front axle that lacks a heavy metal bar that would form part of the unsprung weight. A vehicle may also have a rear axle of comparable construction that also lacks such a bar. Such a rear axle may have either non-steered road wheels or steered road wheels coupled with the steering system for steering in coordination with the front wheels to provide AWS. The presence of two steering axles can be effective to reduce the turning radius of the vehicle, a benefit for a commercial truck or bus that operates on public streets, especially streets in a crowded urban environment. The brake system is effective on both front and rear axles, and either or both axles can be driven by motor 34 and gear box 36.

While a presently preferred embodiment of the invention has been illustrated and described, it should be appreciated that principles of the invention apply to all embodiments falling within the scope of the following claims.

What is claimed is:

1. A vehicle chassis comprising:
    a chassis frame having a first cross member that bridges right and left side rails;
    front right and left wheel units respectively comprising front right and left steered road wheels suspended from the chassis frame by respective multi-link suspensions;
    a steering system that includes a steering unit mounted on the chassis frame for steering the front steered road wheels;
    an electric motor and gear box mounted on the first cross member and coupled to the front right and left steered road wheels by respective drive shafts;
    and a brake system for the front steered road wheels, wherein the weight of the brake system is supported by the chassis frame.

2. A vehicle chassis as set forth in claim 1 wherein the steering unit comprises a steering gear, and the steering system comprises a linkage coupling the steering gear with the front steered road wheels.

3. A vehicle chassis as set forth in claim 1 wherein the steering unit comprises a rack-in-pinion unit, and the steering system comprises a coupling of the rack-in-pinion unit with the front steered road wheels that provides symmetric steering of the front steered road wheels.

4. A vehicle chassis as set forth in claim 1 wherein the chassis frame comprises a second cross member that bridges the right and left side rails and is spaced from the first cross member; and
    rear right and left wheel units respectively comprising rear right and left steered road wheels suspended from the chassis frame at the second cross member by respective multi-link suspensions and steered by the steering system in coordination with the front right and left steered road wheels.

5. A vehicle chassis as set forth in claim 4 wherein the right and left steered road wheels at both cross members are coupled with the gear box.

6. A vehicle chassis as set forth in claim 5 wherein the brake system is effective to brake the right and left steered road wheels at both cross members.

7. A vehicle chassis as set forth in claim 1 further including a passenger bus body mounted on the chassis frame.

8. A vehicle chassis as set forth in claim 1 further including a truck cab mounted on the chassis frame.

* * * * *